Nov. 12, 1957  G. C. SEAVEY  2,813,181
AUTOMATIC CURRENT CONTROLLER
Filed June 5, 1953                2 Sheets-Sheet 1

Gordon C. Seavey
Inventor
by *A. R. Hulbert*
Attorney

Nov. 12, 1957  G. C. SEAVEY  2,813,181
AUTOMATIC CURRENT CONTROLLER
Filed June 5, 1953  2 Sheets-Sheet 2

Gordon C. Seavey
Inventor
by  L. R. Hulbert
Attorney ic Office 2,813,181
Patented Nov. 12, 1957

2,813,181

AUTOMATIC CURRENT CONTROLLER

Gordon C. Seavey, Arlington, Mass., assignor to Sonic Research Corporation, Boston, Mass., a corporation of Massachusetts Application June 5, 1953, Serial No. 359,921

2 Claims. (Cl. 201—51)

This invention relates to apparatus for automatically controlling the current delivered to electrically powered equipment. More specifically, it provides an apparatus through which the current delivered to such equipment may be automatically varied so as to maintain the desired operating characteristics of said equipment within very narrow limits.

One object of this invention is to provide for such control governed by operating elements responsive to equipment operating conditions but having themselves a very low power output, in the range of microwatts.

Another object is to provide apparatus which is sharply responsive to even slight changes in equipment operating conditions, and with very slight time lag.

Still another object is to provide such current control apparatus which is simple, small, inexpensive, and at the same time reliable, and characterized by a long life.

Yet another object is to provide such an apparatus which is characterized by stepless control, permitting thus both increased accuracy and decreased maintenance.

Another object is to provide such apparatus which is capable of operation with low power costs and which could make feasible the conversion of much manually controlled equipment to automatic operation.

Generally speaking, in this invention the power output from a signal element, such as a vibration pickup or thermocouple, responsive to equipment operating conditions, is picked up, amplified, and connected to the grid of a vacuum tube controlling current flow through a solenoid coil. Connection is made in such a way that a change in the power output of the signal element will result in a change in the solenoid coil current. Decreasing the current through the solenoid coil decreases the pressure of a metal core on a novel pile of thin carbon discs of alternating larger and smaller diameters, thus increasing the resistance of the carbon pile.

Said carbon pile is connected so that the current to be automatically controlled passes therethrough. Accordingly, a change in the power output of the signal element responsive to equipment operating conditions, reflecting a change therein, works through the amplifier, solenoid coil, and metal solenoid core to change the resistance of the carbon pile and thereby change the current going to operate said equipment, thereby restoring its operating conditions to the desired range. The circuit may be set up so that an increase in the power output of the signal element decreases the current through the solenoid coil, as in Figs. 3 and 4, or the reverse.

One feature of my new carbon pile is that carbon elements of alternatingly larger and smaller area are included therein, so that fins for cooling purposes are produced.

A further novel feature of my carbon pile is that the shaft against which said carbon elements slide in being compressed and released is oriented vertically, so that friction therein during operation is minimized, to provide smooth continuous control.

Another feature of my carbon pile is that friction therein is further minimized by providing with a glass or other smooth hard surface the shaft against which said carbon elements slide, as by using a glass rod or a supported glass tube.

Another feature of my new carbon pile is that the elements of the pile are at all times spaced so closely together that dust particles are substantially excluded from between the carbon elements, so that the operating characteristics of the pile remain constant during use over long periods of time.

Still another feature of my carbon pile is that the actual weight of the solenoid core on the pile is counter-balanced by a spring, so that its effective resistance range is greatly increased.

Other features and advantages of my invention will be apparent from the following drawings and description of a preferred embodiment thereof, in which.

Figure 1:
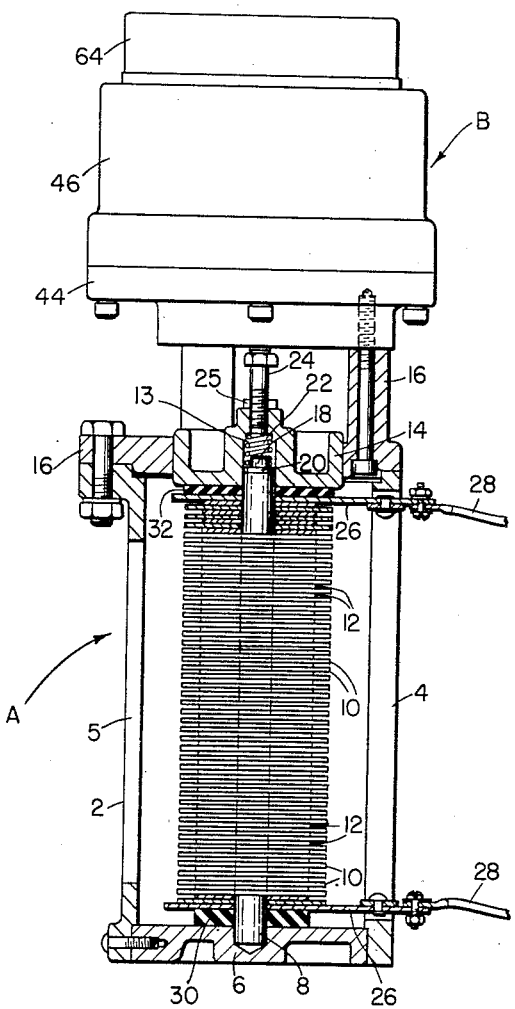
Fig. 1 is an elevation view, partially in section, of my new assembly including solenoid coil, solenoid core and carbon pile.
Figure 2:
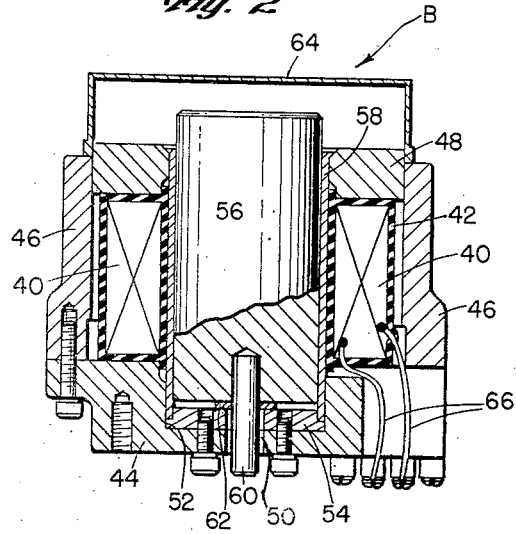
Fig. 2 is a sectional view through the solenoid portion of said assembly showing the solenoid core in its bottom position.

Referring now to the drawings, there is indicated generally by the letter A a carbon pile assembly and by the letter B a solenoid assembly.

The carbon pile assembly A is mounted in a housing 2 having therein vertical longitudinally extending slots 4 and 5 to permit circulation of air therethrough. The housing 2 may suitably be mounted on a manifold (not shown) through which a fan blows air in through slot 5 and out through slot 4 to cool the carbon plates and minimize resistance change due to temperature variations. The slot 4 serves also as a passage for electrical leads. A bottom portion 6 is secured to the housing 2 by any suitable means, as with screws. Centrally of said bottom portion is drilled a blind faced hole wherein is seated a glass rod 8. This glass rod 8 extends vertically through a pile of carbon discs 10 and 12 of respectively larger and smaller diameter, and terminates in a hole 13 located centrally of pressure-transmitting element 14, which is slidably mounted with respect to said rod 8. Said element 14 is also slidably mounted within top portion 16, which in turn is secured beneath to the housing 2 and above to the solenoid and core assembly B, by means of bolts and screws, respectively. At the upper end of the glass rod 8 is a shank 18, which extends through a washer 20. Resting on the washer 20 and around the shank 18, and secured against upward movement by the blind face of the hole 13, is a spring 22. Extending from the top of the pressure-transmitting element 14 is a projection 24, which may suitably be a screw, threadedly mounted centrally in the top of said element 14 and held in place by a lock nut 25.

At the top and bottom of the pile of carbon discs 10 and 12 are contact plates 26, which extend through the vertical slot 4 and are connected to electrical leads 28. Between the lower contact plate 26 and the bottom portion 6, and around the glass rod 8, is situated an insulating washer 30. Similarly, between the upper contact plate 26 and the element 14 is located an insulating washer 32.

The solenoid coil 40 is enclosed in insulation 42 and mounted on bottom plate 44 within housing 46, the latter being secured to said bottom plate 44 by suitable means, as with screws. Resting on said solenoid coil and within the housing 46 is bushing 48. The housing 46, the bottom plate 44, and the bushing 48 are all part of the magnetic circuit, and are of magnetic material.

The bottom plate 44 is provided centrally with a hole 50 having a large counterbore 52 thereabove. Seated in said counterbore and secured thereto by screws is washer 54 of magnetic material, the hole in which may suitably be of the same diameter as the hole 50.

The heavy solenoid core 56 of magnetic metal is vertically slidably mounted within the non-magnetic brass cylindrical sleeve 58, which is in turn mounted within the solenoid 40 and to which the washer 54 is silver-soldered. Projecting centrally from beneath said core 56 is a non-magnetic aluminum shank 60, which extends through the washer 54 and the hole 50 and abuttingly engages the projection 24. Between said core 56 and washer 54, and around the shank 60, is a non-magnetic washer 62.

Over the top of the entire solenoid assembly is fitted the removable dust cap 64. The electrical leads 66 to the solenoid coil 40 extend through a slot 68 in the bottom plate 44.

Figure 3:
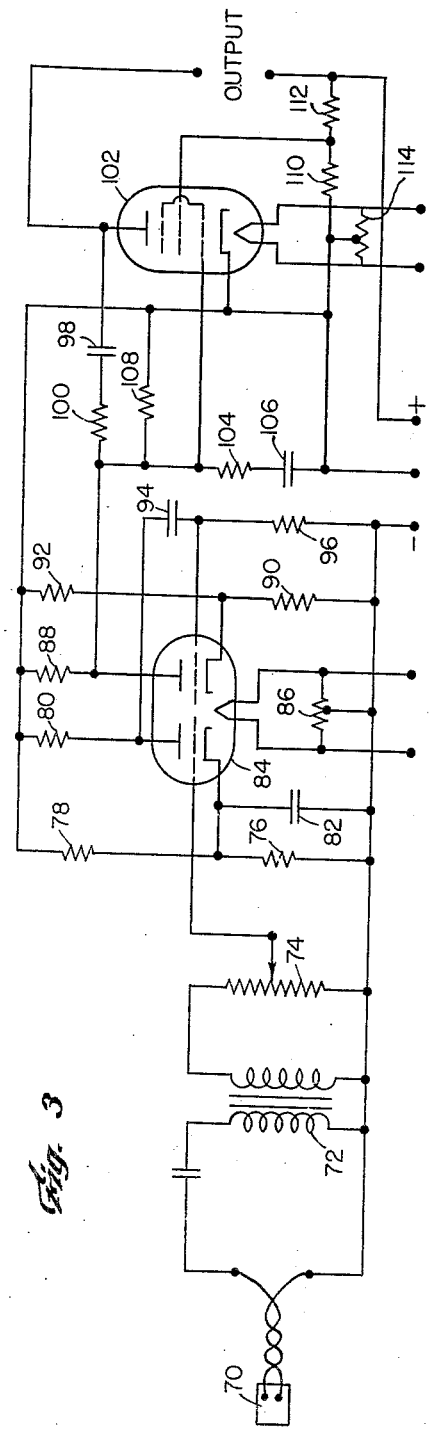
Fig. 3 is a wiring diagram of a preferred amplifier circuit for use in one application of the invention to control the amplitude of a vibratory refiner for paper pulp.

In Fig. 3 is shown, by way of illustration, an amplifier circuit which has the desired promptly responsive and non-hunt characteristics, and is particularly suitable for use in controlling the amplitude of vibration of a vibratory refiner for paper pulp. The components thereof and their characteristics are as follows:

| Number | Element | Designation |
| --- | --- | --- |
| 70 | Vibration pickup | 1 to 2 volt output (3 ohms). |
| 72 | Transformer | 7 to 1. |
| 74 | Potentiometer | 1 megohm. |
| 76 | Resistance | 3,900 ohms. |
| 78 | do | 5,600 ohms. |
| 80 | do | 470,000 ohms. |
| 82 | Condenser | 4 microfarads. |
| 84 | Vacuum Tube | RCA No. 5691. |
| 86 | Resistance | 1,000 ohms. |
| 88 | do | 100,000 ohms. |
| 90 | do | 3,900 ohms. |
| 92 | do | 33,000 ohms. |
| 94 | Condenser | 0.05 microfarad. |
| 96 | Resistance | 1 megohm. |
| 98 | Condenser | 4 microfarads. |
| 100 | Resistance | 100,000 ohms. |
| 102 | Vacuum Tube | RCA No. 807. |
| 104 | Resistance | 150,000 ohms. |
| 106 | Condenser | 4 microfarads. |
| 108 | Resistance | 100,000 ohms. |
| 110 | do | 10,000 ohms. |
| 112 | do | 10,000 ohms. |
| 114 | do | 1,000 ohms. |

Figure 4:
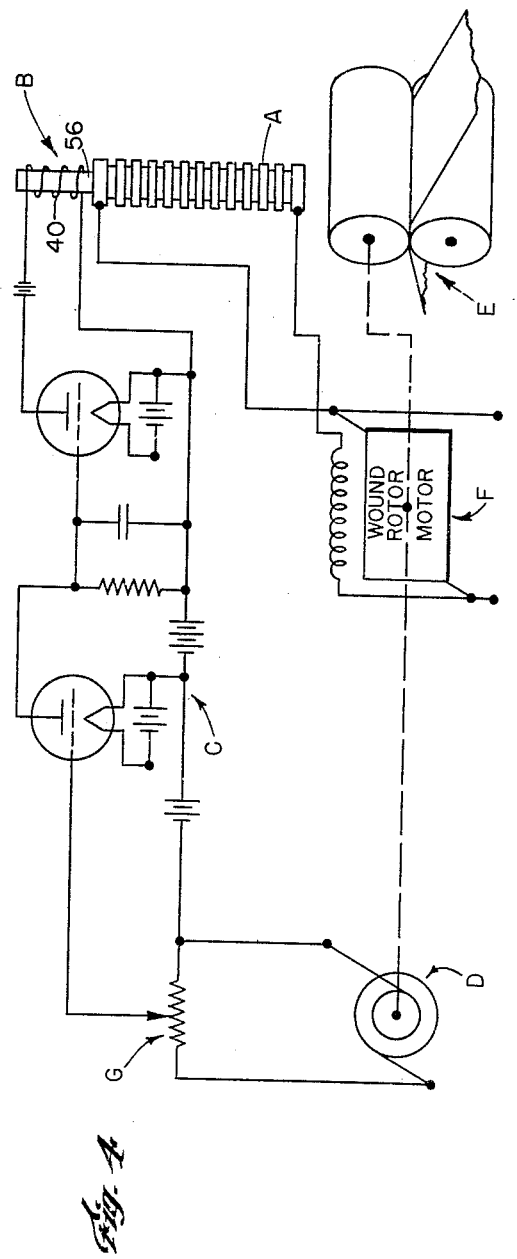
Fig. 4 is a diagrammatic view of the invention, showing for purposes of illustration a simplified amplifier circuit.

The operation of my invention may best be described in connection with diagrammatic Fig. 4. Motor F is shown as driving the press rolls E, which it is desired to operate at a large number of different predetermined speeds, with each speed maintained within narrowly defined limits of error. The power required to operate these rolls at a given speed varies however with the thickness of the material being passed therebetween, and therefore if power supplied were let to remain constant, speed would vary during a run with the thickness and consistency of said material. My invention makes possible the prevention of such variation.

An element D, which may suitably be an electrical tachometer generator, is operated by said press rolls and reflects any increase in speed therein by an increased power output, though this power may be in the microwatt range. This in turn operates through the amplifier C and solenoid assembly B to decrease pressure of the core 56 on carbon pile A, and thus increase the resistance through said carbon pile in series with the armature of the wound rotor motor F, thereby reducing the power delivered to the press rolls E and keeping their speed at the predetermined figure. If the speed of the press rolls decreases, the reverse occurs, again keeping the speed of the press rolls at the predetermined rate. The actual weight of the core 56 is substantially counterbalanced by the spring 22, so as to increase the effective range of the carbon pile. It is preferable however to allow the weight of said core to exert a slight force, say ¼ lb., on said pile at all times, to prevent sparking. The predetermined speed is selected by suitably adjusting the potentiometer G.

It will be apparent that my invention is capable of controlling the operating conditions of many types of equipment. For example, it may be used to control the R. P. M. of electric motors under varying load conditions, the temperature of a heating element, the amplitudes of vibration of a vibrating element used in treating paper pulps of variable viscosity, or to control electrolytic processes.

The power generating signal element responsive to the various operating conditions to be controlled may be, for example, instead of an electrical tachometer, a vibration pick-up, a thermocouple, a resistance temperature bulb, a photoelectric cell, a microphone, an inonization chamber, or a pH cell.

A multiplicity of my new assemblies of carbon piles and solenoids may be used in series if desired. A separate amplifier may be used with each of said assemblies, or more than one such assembly may be used per amplifier.

It will be apparent that other embodiments of my invention may be made by those skilled in the art without departing from the spirit of my invention.

I claim:

1. A carbon pile assembly which comprises a vertically cylindrical housing having therein two oppositely disposed slots, a bottom portion closing the lower extremity of said housing and secured to said housing, a top portion secured to said housing at the upper extremity thereof, said top portion being adapted for mounting thereabove a solenoid assembly, a pile of thin carbon disks vertically stacked within said housing, said disks being of alternately larger and smaller diameter and each of said disks having in the center thereof a hole for accepting a shaft, two contact disks with similar holes therein, one beneath said pile and one on top thereof, a glass-surfaced shaft extending through said carbon disks and contact disks, said shaft resting in a blind hole located centrally of said bottom portion and being mounted at its upper extremity within an element for transmitting pressure to said pile from a solenoid core mounted thereabove, said pressure transmitting element being slidably mounted within said top portion and around said shaft, a spring mounted atop said shaft for urging said pressure transmitting element upwards to counteract substantially all the weight of a solenoid core, and two insulating washers, one mounted between the upper of said contact disks and said pressure transmitting element and the other mounted between the lower of said contact disks and said bottom portion.

2. A carbon pile assembly which comprises a slotted housing having a vertical axis, a bottom portion closing the lower extremity of said housing and secured to said housing, a top portion secured to said housing at the upper extremity thereof, said top portion being adapted for mounting thereabove a solenoid assembly, a pile of thin carbon disks vertically stacked within said housing, said disks being of alternately larger and smaller diameter and each of said disks having in the center thereof a hole for accepting a shaft, two contact disks with similar holes therein, one beneath said pile and one on top thereof, a glass-surfaced shaft extending through said carbon disks and contact disks, said shaft resting in said bottom portion and being mounted at its upper extremity within an element for transmitting pressure to said pile from a solenoid core mounted thereabove, said pressure transmitting element being slidably mounted within said top portion and around said shaft, a spring mounted atop said shaft for urging said pressure transmitting element upwards to counteract the weight of a solenoid core, and two insulating washers, one mounted between the upper of said contact disks and said pressure transmitting element and the other mounted between the lower of said contact disks and said bottom portion.

(References on following page)

References Cited in the file of this patent

UNITED STATES PATENTS

| | | |
|---|---|---|
| 805,505 | Waddell | Nov. 28, 1905 |
| 1,679,539 | Neal | Aug. 7, 1928 |
| 2,300,471 | Smith | Nov. 3, 1942 |
| 2,318,359 | Bellows | May 4, 1943 |
| 2,419,491 | Gartner | Apr. 22, 1947 |
| 2,504,489 | Bechberger | Apr. 18, 1950 |
| 2,565,989 | Rady et al. | Aug. 28, 1951 |
| 2,627,007 | Richards | Jan. 27, 1953 |